United States Patent
Smith (10) Patent No.: US 11,324,197 B2
(45) Date of Patent: May 10, 2022

(54) ANIMAL TAG APPLICATOR

(71) Applicant: CERES TAG PTY LTD, Brisbane (AU)

(72) Inventor: David Ian Smith, Brisbane (AU)

(73) Assignee: CERES TAG PTY LTD

( * ) Notice: Subject to any disclaimer, the term of this patent is extended or adjusted under 35 U.S.C. 154(b) by 9 days.

(21) Appl. No.: 17/253,640

(22) PCT Filed: Jun. 14, 2019

(86) PCT No.: PCT/AU2019/050612
§ 371 (c)(1),
(2) Date: Dec. 18, 2020

(87) PCT Pub. No.: WO2019/241831
PCT Pub. Date: Dec. 26, 2019

(65) Prior Publication Data
US 2021/0259208 A1    Aug. 26, 2021

(30) Foreign Application Priority Data
Jun. 18, 2018   (AU) ............................... 2018902153

(51) Int. Cl.
*A01K 11/00*        (2006.01)
(52) U.S. Cl.
CPC .................................. *A01K 11/002* (2013.01)
(58) Field of Classification Search
CPC ........ A01K 11/001–004; A01K 1/0209; A01K 13/003; A61B 17/3468; A61B 17/34;
(Continued)

(56) References Cited

U.S. PATENT DOCUMENTS 2,430,853 A    11/1947  Barger
3,941,134 A *   3/1976  McDonald ............. A44C 7/001
                                                      606/188
(Continued)

FOREIGN PATENT DOCUMENTS

| AU | 8306575 A | 1/1977 |
| DE | 19835014 A1 | 8/1999 |
| FR | 1427470 A | 2/1966 |

OTHER PUBLICATIONS

Search Report for International Patent Application PCT/AU2019/050612, dated Dec. 26, 2019.

*Primary Examiner* — Erich G Herbermann
(74) *Attorney, Agent, or Firm* — Fresh IP PLC; Clifford D. Hyra; Aubrey Y. Chen (57) ABSTRACT

An animal tag applicator comprising: first and second jaws for engaging an animal tag therebetween wherein the second jaw is movable relative to the first jaw for mounting said animal tag on the animal; a movable lever coupled to the second jaw, the lever being arranged such that at least a first movement of the lever results in a resilient bias being applied to the second jaw for rectilinear movement of the second jaw towards the first jaw; a stop member positioned relative to the second jaw member for maintaining the second jaw member in an intermediate spaced apart position relative to the first jaw to prevent biased movement of the second jaw towards the first jaw when the lever is in the actuated position; a trigger member coupled with the stop member such that movement of the trigger member into a triggered position effects biased rectilinear movement of the second jaw towards the first jaw when the lever is in the actuated position.

12 Claims, 13 Drawing Sheets

(58) Field of Classification Search
CPC .... A41H 37/00; A41H 37/005; A41H 37/006; A44C 7/00; A44C 7/001
See application file for complete search history.

(56) References Cited

U.S. PATENT DOCUMENTS

| | | | |
|---|---|---|---|
| 4,030,506 | A | 6/1977 | McDonald |
| 8,070,757 | B2 | 12/2011 | Eadie |
| 9,215,862 | B2 | 12/2015 | Bladen et al. |

* cited by examiner

ANIMAL TAG APPLICATOR

TECHNICAL FIELD

This invention relates generally to an applicator tool which is particularly suited for the application of ear tags to animals.

BACKGROUND

Any references to methods, apparatus or documents of the prior art are not to be taken as constituting any evidence or admission that they formed, or form part of the common general knowledge.

Many forms of applicator tools are known whereby an ear tag can be applied to the ear of an animal. The most common applicator tool is of a pliers type which comprises a pair of levers pivotally coupled together. To one side of the pivot the levers are formed as handles whilst on the other side they are formed as jaws which have retention means for retaining an animal ear tag part. A development of this general pliers type tool also includes an improvement that allows the jaws to retract immediately once the tag has been installed in the ear of the animal.

One of the problems associated with a pliers type applicator is that the jaws of the tool move on an arc which can lead to misalignment of one tag part in relation to the other during installation of the tag in the animal's ear. Accordingly, applicator tools have been developed whereby retention means for one of the jaws moves rectilinearly relative to the other.

This applicator tool not only has one of the retention means moving rectilinearly relative to one another but also has automatic retraction means such that upon completion of installation of the tag the movable retention means retracts.

One of the criteria which must be met with an applicator tool is that there must be sufficient space between the parts of the tag when retained by the retention means to facilitate the easy positioning therebetween of the ear of an animal. One way in which this gap can be obtained is to have the jaws pivot sufficiently away from one another when the applicator tool is opened. In this manner the required gap is provided, however, the applicator is often difficult to handle due to the handles thereof being too far apart for ease of use. Another issue with prior art applicator tools is that these tools require a high lever force during actual penetration of the tag into the animal's ear and the coupling of the male and female parts of the tag.

SUMMARY OF INVENTION

In one aspect, the invention provides an animal tag applicator comprising:

first and second jaws for engaging an animal tag therebetween wherein the second jaw is movable relative to the first jaw for mounting said animal tag on the animal;

a movable lever coupled to the second jaw, the lever being arranged such that at least a first movement of the lever into an actuated position results in a resilient bias being applied to the second jaw for movement of the second jaw towards the first jaw;

a stop member positioned relative to the second jaw member for maintaining the second jaw member in an intermediate spaced apart position relative to the first jaw to prevent biased movement of the second jaw towards the first jaw when the lever is in the actuated position;

a trigger member coupled with the stop member such that movement of the trigger member into a triggered position effects biased movement of the second jaw towards the first jaw when the lever is in the actuated position.

In an embodiment, the animal tag applicator further comprises a biasing arrangement positioned relative to the lever and the second jaw for biasing the second jaw in said at least actuated position of the lever.

In an embodiment, the lever is pivotally movable relative to a handle, the lever being arranged such that pivotal movement of the lever towards the handle in the actuated position results in the resilient bias being applied to the second jaw for rectilinear movement of the second jaw towards the first jaw.

In an embodiment, the lever comprises:

a proximal portion for receiving a user's hand to effect pivotal movement of the lever and a distal portion; and a distal portion for engaging said second jaw and applying said bias in the actuated position.

In an embodiment, the animal tag applicator further comprises a pivoting arrangement for allowing said pivotal movement of the lever relative to the handle, the pivoting arrangement being positioned in between the proximal and distal portions of the lever.

In an embodiment, the distal portion of the lever comprises a retaining portion for receiving and retaining a biasing member to apply resilient bias to the second jaw for rectilinear movement of the second jaw towards the first jaw.

In an embodiment, the second jaw further a frontal portion with a tag engaging surface and a rear portion structured to be coupled with the biasing member.

In an embodiment, the animal tag applicator further comprises a sliding arrangement for allowing the second jaw to slide along a supporting member positioned on an upper portion of the handle and support the second jaw member during use. A secondary sliding arrangement also allows the second jaw to slide along a portion of the first jaw.

In an embodiment, the supporting member is configured to engage with a lower portion of the second jaw to allow the second jaw to slide along a length of supporting portion.

In an embodiment, the lower portion of the second jaw comprises engagement portions to engage and slide along one or more grooves extending along the length of the supporting member.

In an embodiment, the second jaw further comprises spaced apart web members, said web members comprising respective spaced apart engagement portions for engagement with corresponding grooves extending along the length of the supporting member.

In an embodiment, movement of the trigger member in an inward direction towards the lever in the triggered position effects downward movement of the stop member thereby allowing biased rectilinear movement of the second jaw towards the first jaw when the lever is in the actuated position.

In an embodiment, the lever comprises a recessed portion for receiving at least a portion of the trigger such that in the triggered position, the trigger member abuts the recessed portion of the lever.

In an embodiment, a lower portion of the stop member is structured to be seated on a seating portion of the trigger member such that the inward movement of the trigger member results pushes the lower portion of the stop member in a downward direction thereby allowing biased rectilinear movement of the second jaw towards the first jaw when the lever is in the actuated position.

In an embodiment, the stop member is substantially elongate and an end portion of the stop member abuts the second jaw member to prevent biased movement of the second jaw towards the first jaw when the lever is in the actuated position.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

FIGS. 1 to 13 illustrates an animal tag applicator 100 in accordance with an embodiment of the present invention. The animal tag applicator 100 comprises a first fixed jaw 110 and a second movable jaw 120. The second jaw 120 is movable relative to the first jaw 110 and the relative movement between the jaws 110 and 120 allows opposed jaw surfaces 115 and 125 to engage with an animal tag positioned in between the jaws 110 and 120. In the preferred embodiment, the second movable jaw 120 is used for pushing and fastening a two-piece tag (not shown) onto an animal.

Figure 1:
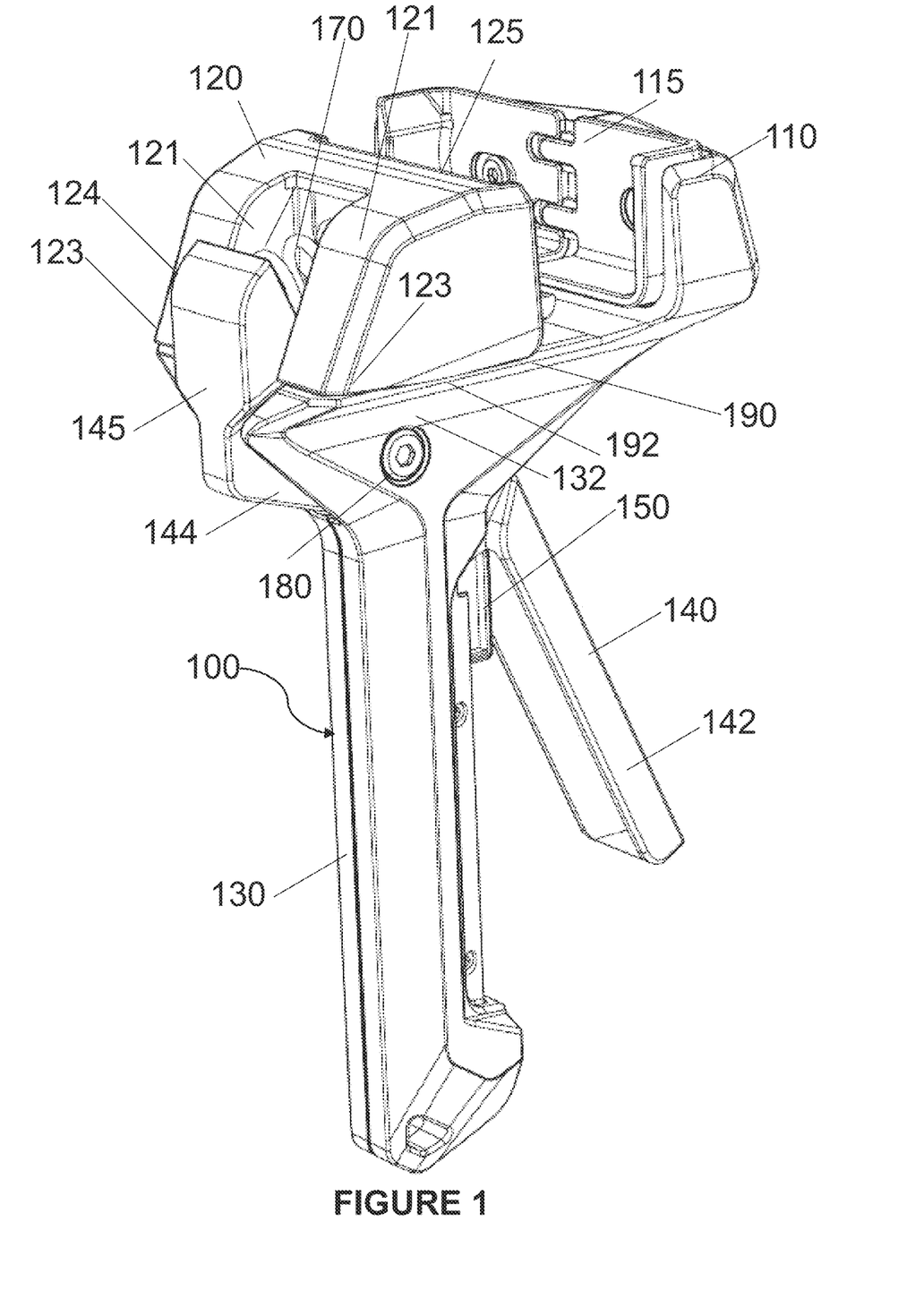
FIG. 1 is a rear perspective view of the animal tag applicator 100 (shown in an open/non-actuated position) in accordance with a first embodiment.
Figure 2:
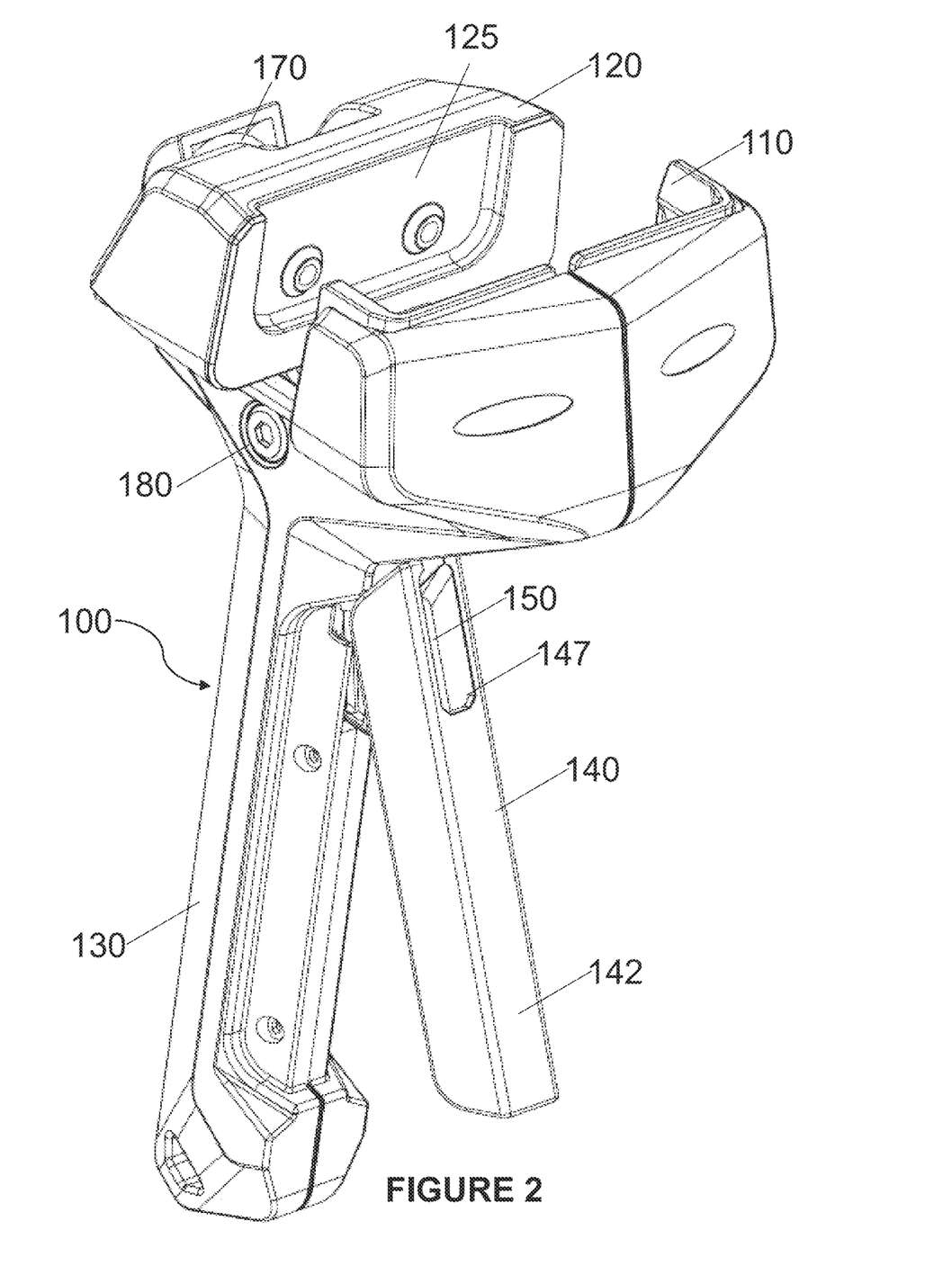
FIG. 2 is a frontal perspective view of the animal tag applicator 100 (shown in an open/non-actuated position).
Figure 3:
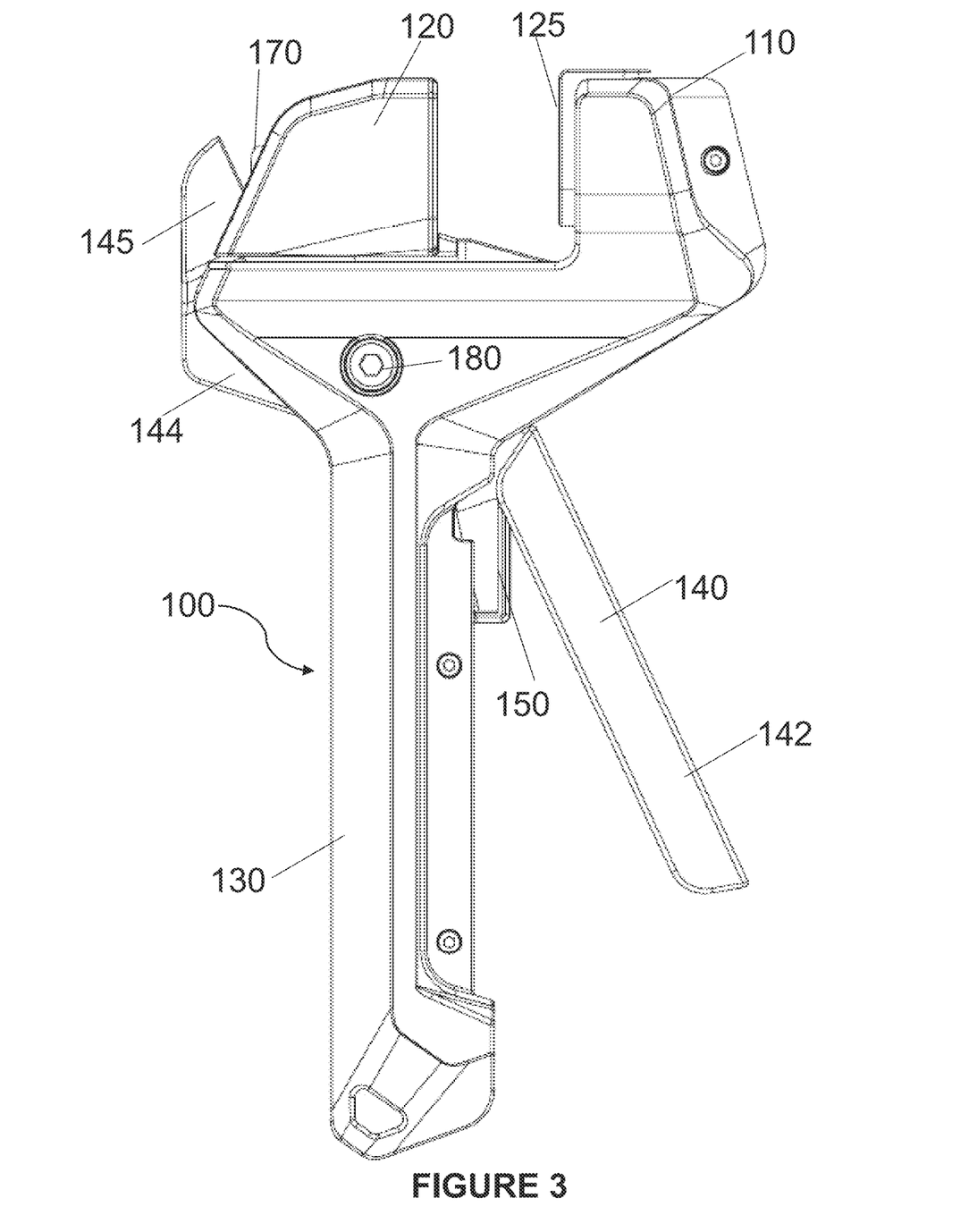
FIG. 3 is a left hand side view of the animal tag applicator 100 (shown in an open/non-actuated position).
Figure 4:
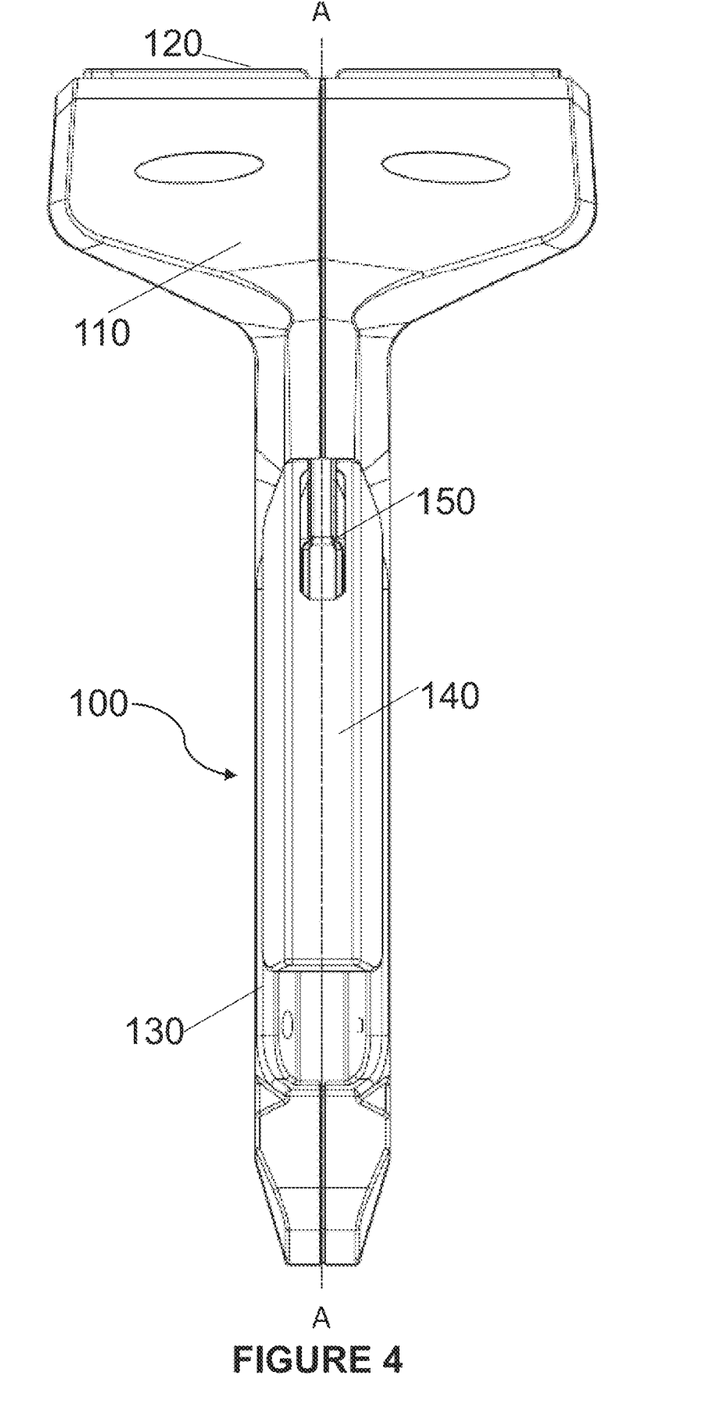
FIG. 4 is a frontal view of the animal tag applicator 100 (shown in an open/non-actuated position).
Figure 5:
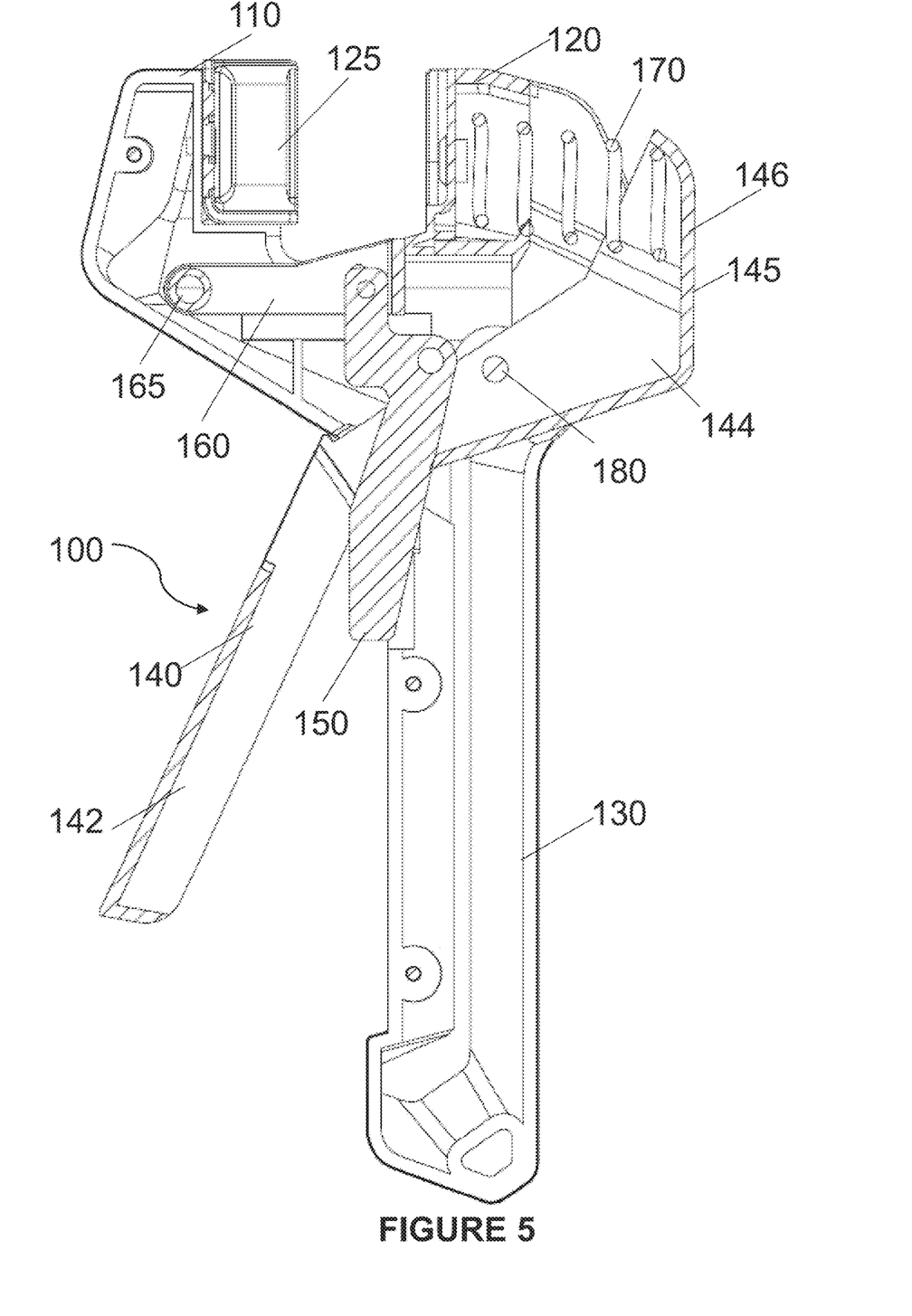
FIG. 5 is a sectional view of the animal tag applicator 100 (shown in an open/non-actuated position).
Figure 6:
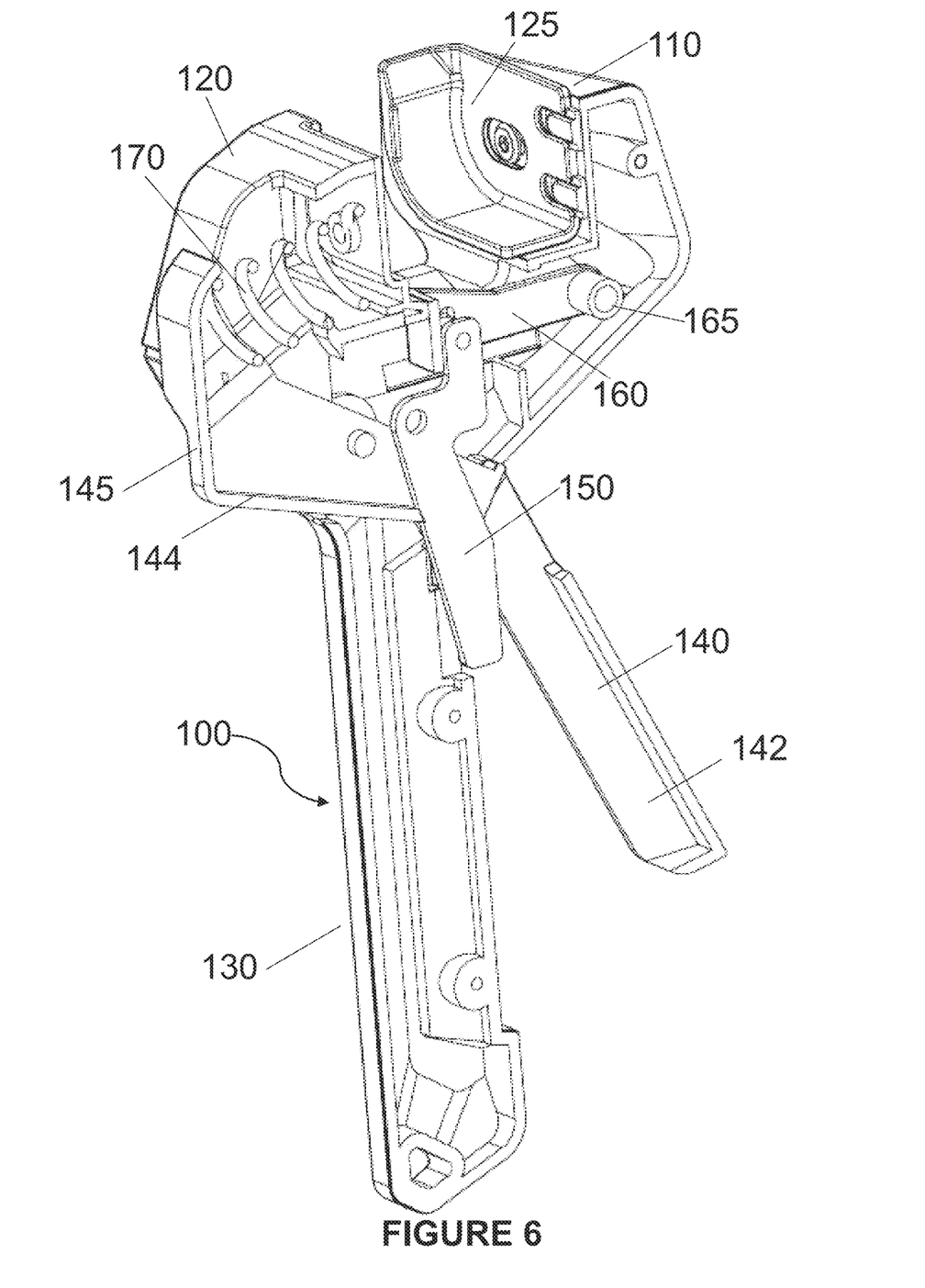
FIG. 6 is a frontal perspective-sectional view of the animal tag applicator 100 (shown in an open/non-actuated position).

Referring to FIGS. 1 and 2 in particular, the second jaw 120 is structured for rectilinear movement towards the first fixed jaw 110. The applicator 100 comprises a sliding arrangement 190 for allowing the second jaw 120 to slide along a supporting member 192 positioned on an upper portion of the handle 130 to support the second jaw 120 during use. The support member 192 is integrally formed with an upper portion 132 of the handle 130 and is configured to engage with a lower portion of the second jaw (or sliding jaw) 120 to allow rectilinear movement of the sliding jaw 120 along the length of the supporting member 190. The sliding jaw 120 (also referred to as the movable jaw throughout the specification) further comprises spaced apart web members 121. Each of the spaced apart web members 121 includes: a first pair respective engagement portions 123 for engagement with corresponding grooves 127 extending along the length of the supporting member 192.

The tag applicator 100 also comprises a lever 140 which is pivotally fastened to the handle 130 by a pivoting arrangement 180. The lever 140 comprises a proximal portion 142 which is positioned in close proximity to the handle 130 to receive a user's fingers when the handle 130 is held in the palm of the user. An intermediate portion 144 of the lever 140 (extending away from the pivoting arrangement 180) is angled relative to the proximal portion 142 and extends transversely relative to the proximal portion 142 of the lever 140. A distal end portion 145 of the lever 140 is bent relative to the intermediate portion 144 and is coupled to a rear section 124 of the second jaw 120 as will be explained in the foregoing sections.

Figure 7:
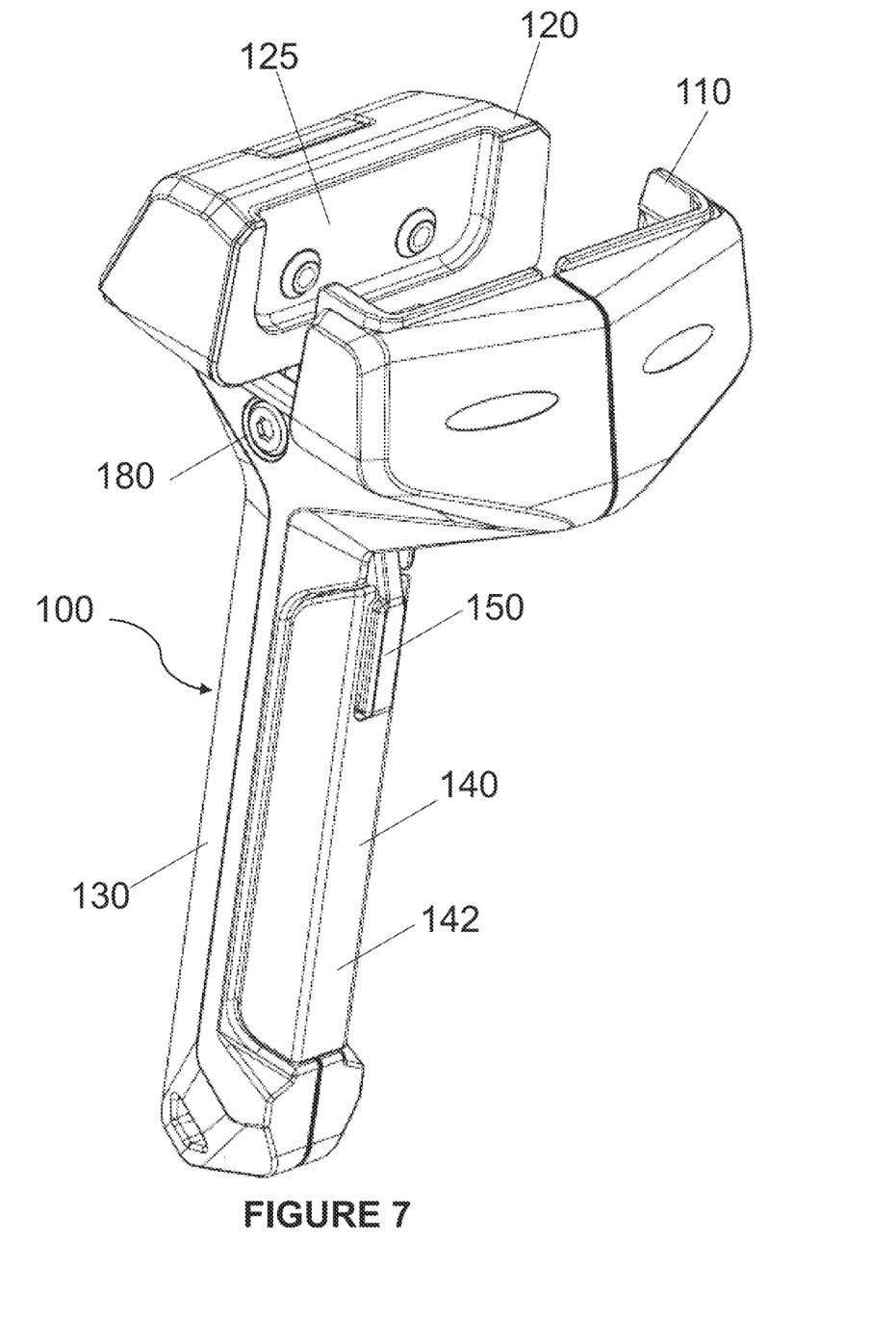
FIG. 7 is a frontal perspective view of the animal tag applicator 100 (lever 140 shown in actuated position and movable jaw 120 shown in a primed position) in accordance with a first embodiment.
Figure 8:
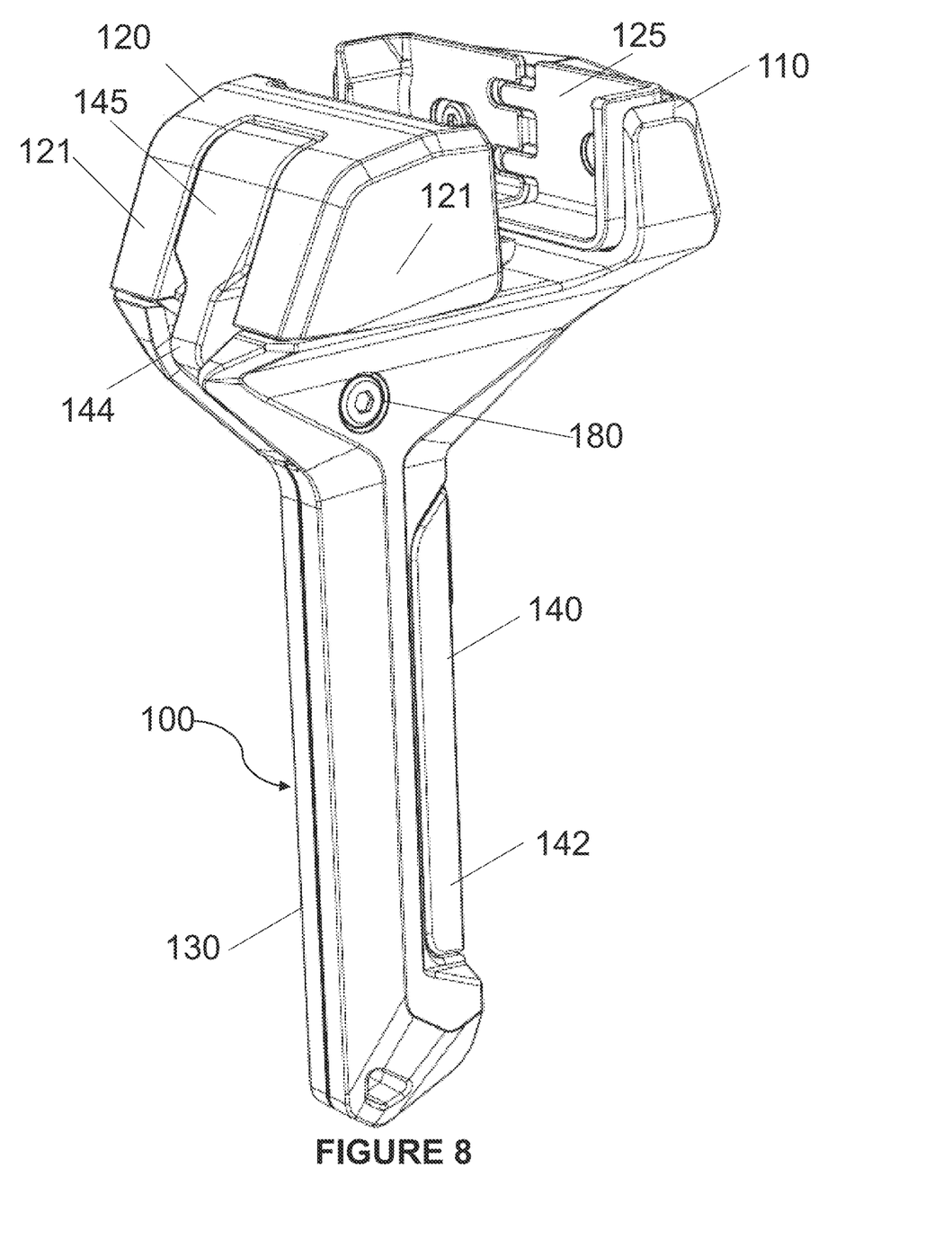
FIG. 8 is a rear perspective view of the animal tag applicator 100 (lever 140 shown in actuated position and movable jaw 120 shown in a primed position).
Figure 9:
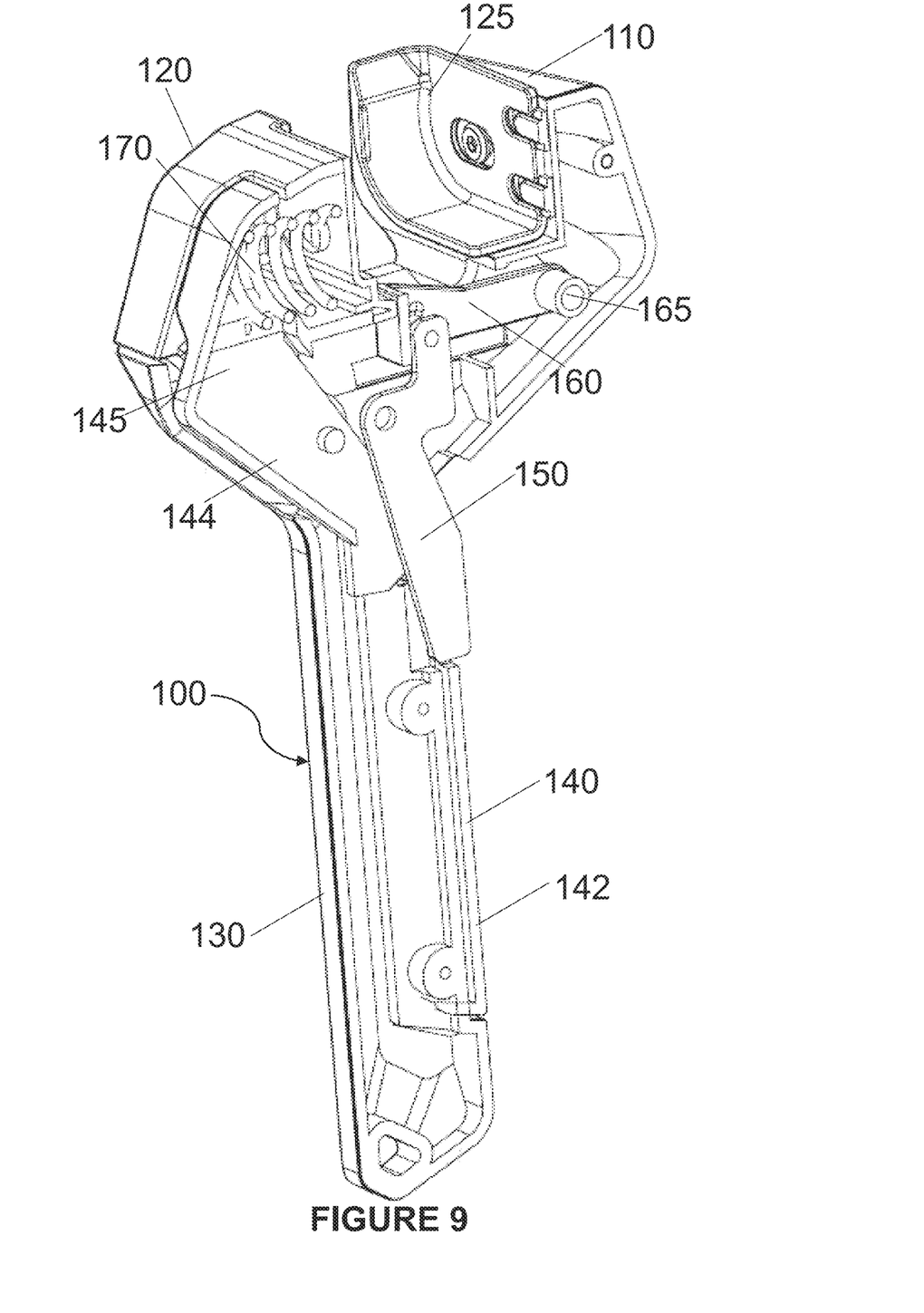
FIG. 9 is a rear perspective-sectional view of the animal tag applicator 100 (lever 140 shown in the actuated position and movable jaw 120 shown in a primed position).

FIGS. 1 to 6 illustrate the animal tag 100 in a non-actuated open position whereby the lever 140, particularly the proximal portion 142 of the lever 140, is spaced away from the handle 130. Pivotal movement of the lever 140 (as a result of the user's fingers pulling the proximal portion 142 of the lever) towards the handle 130 into an actuated position effects movement of the distal end portion 145 towards the second jaw 120. FIGS. 7 to 9, illustrate the animal tag applicator 100 in the actuated position (which shows the movable jaw 120 in a primed position that will be explained in the foregoing sections) whereby which the lever 140 has been pivoted by the user such that the lever 140 is held in close proximity to the handle 130.

A biasing arrangement comprising a spring 170 is positioned in between the rear section 124 of the second jaw 120 and the distal end portion 145 such that the movement of the lever 140 (in a direction towards the handle 130-as described above) results in a resilient bias being applied to the second jaw 120 in the primed position. A stop member 160 is positioned adjacent the second jaw 120 to maintain the second jaw 120 in an intermediate spaced apart position relative to the first jaw 110 (which is also referred to a primed position) to limit biased movement of the second jaw 120 towards the first fixed jaw 110 when the lever 140 is in the primed position. In other words, the stop member 160 limits movement of the second movable jaw member 120 particularly when the second jaw 120 is held under resilient bias applied by the spring 170 when the lever 140 is in the actuated position. The distal portion 145 of the lever 140 comprises a spring retention member 146 to engage and retain an end portion of the spring 170 during use.

Figure 10:
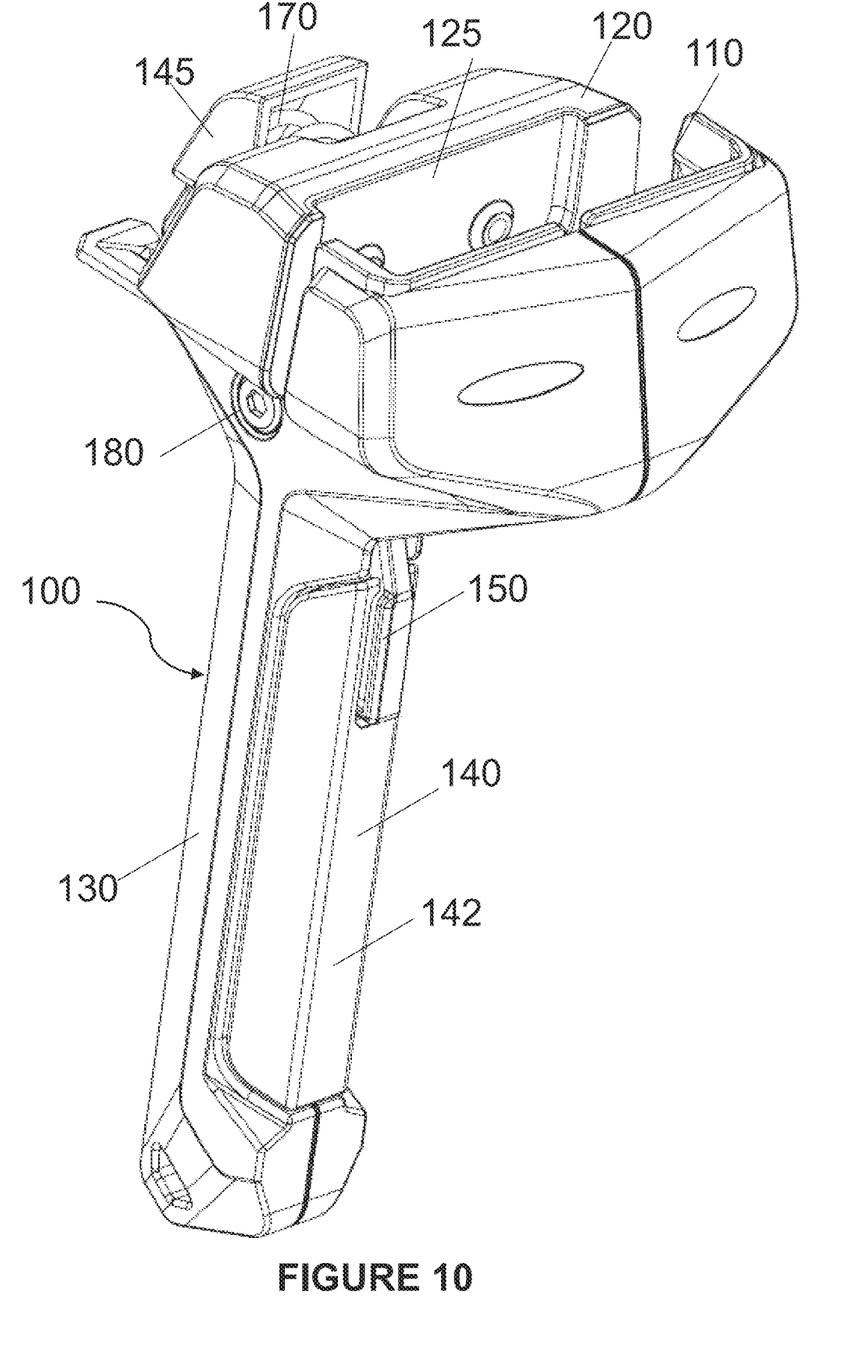
FIG. 10 is a frontal perspective view of the animal tag applicator 100 (lever 140 shown in the actuated position and movable jaw 120 shown in a primed position).
Figure 11:
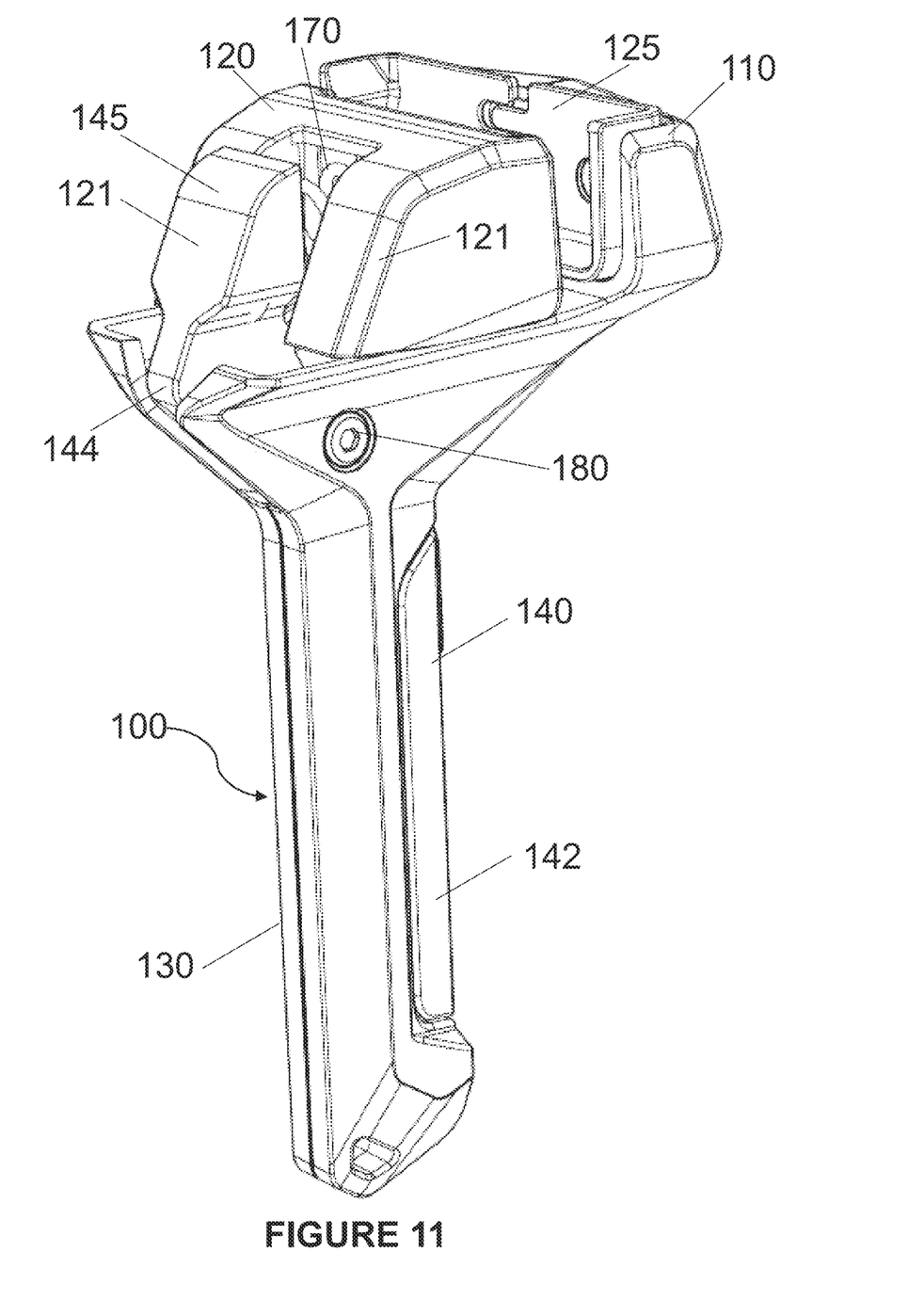
FIG. 11 is a rear perspective view of the animal tag applicator 100 (shown in a triggered position).
Figure 12:
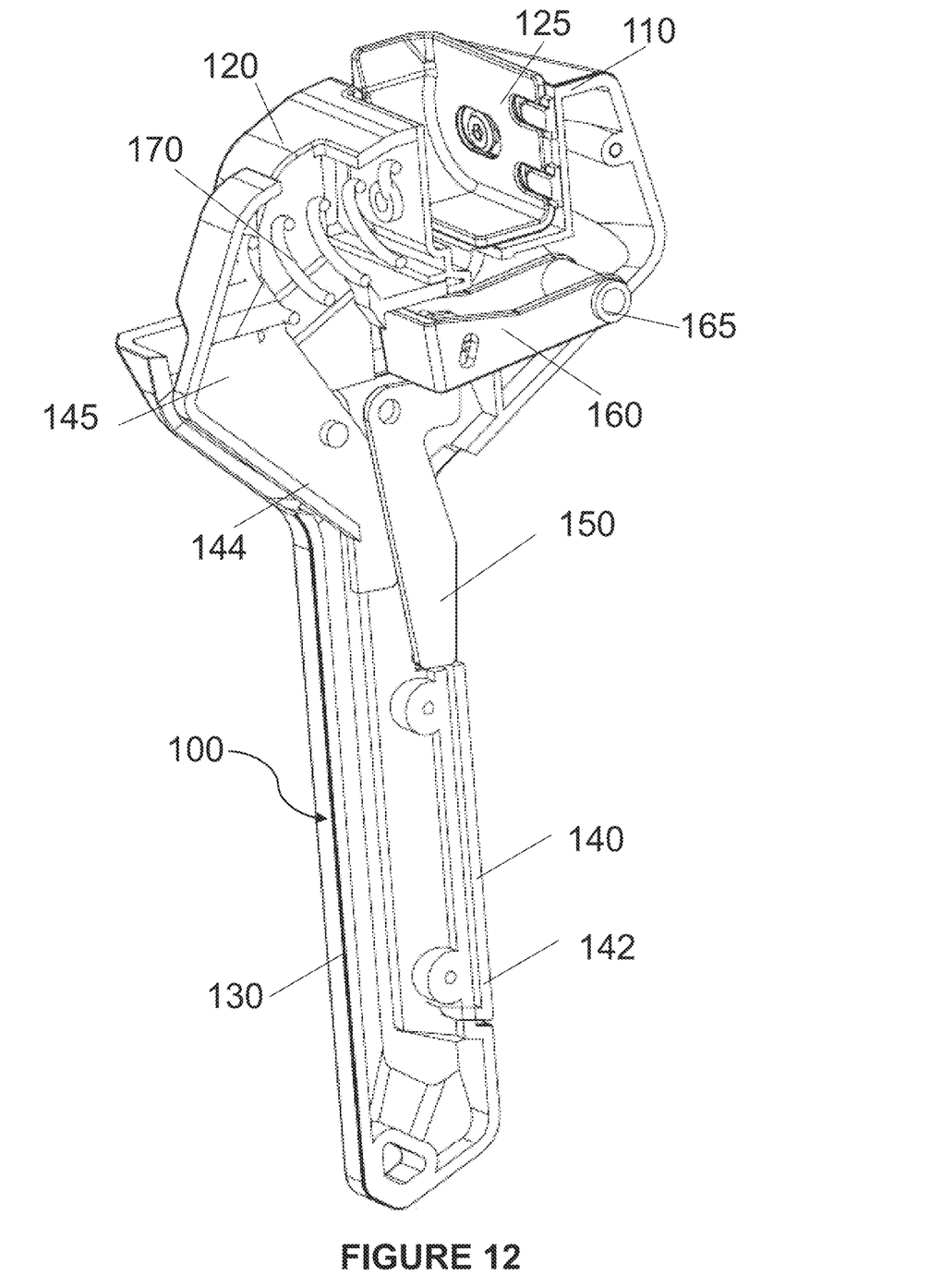
FIG. 12 is a rear perspective-sectional view of the animal tag applicator 100 (shown in the triggered position).
Figure 13A:
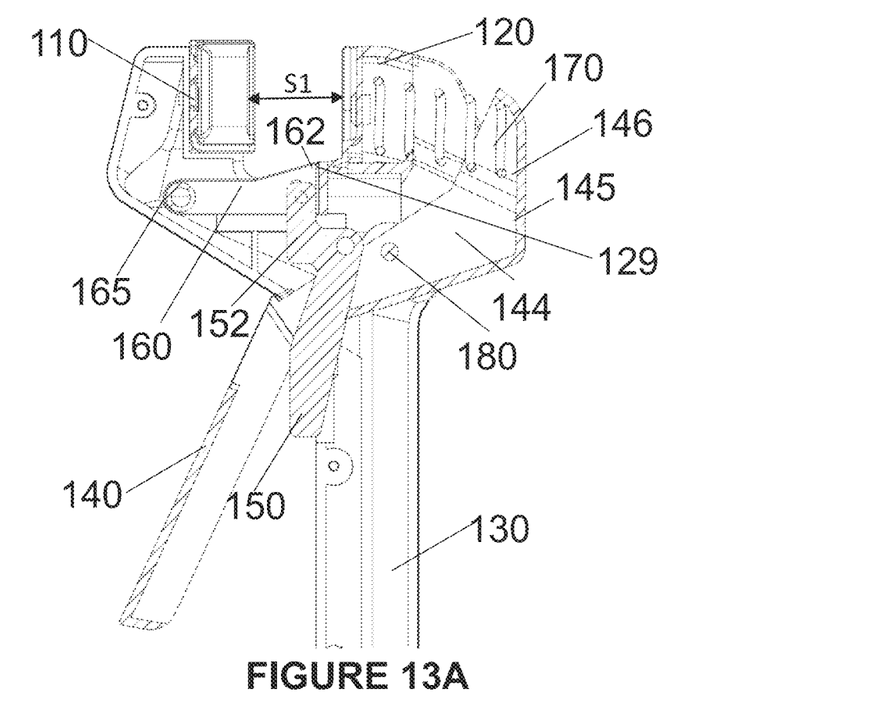
FIG. 13A is an enlarged view of the animal tag applicator 100 in the open or non-actuated position.
Figure 13B:
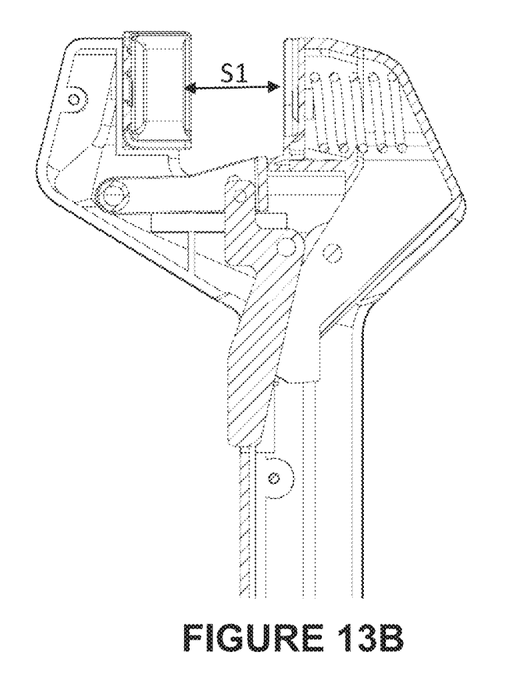
FIG. 13B is an enlarged view of the animal tag applicator 100 (lever 140 shown in the actuated position and movable jaw 120 shown in a primed position).
Figure 13C:
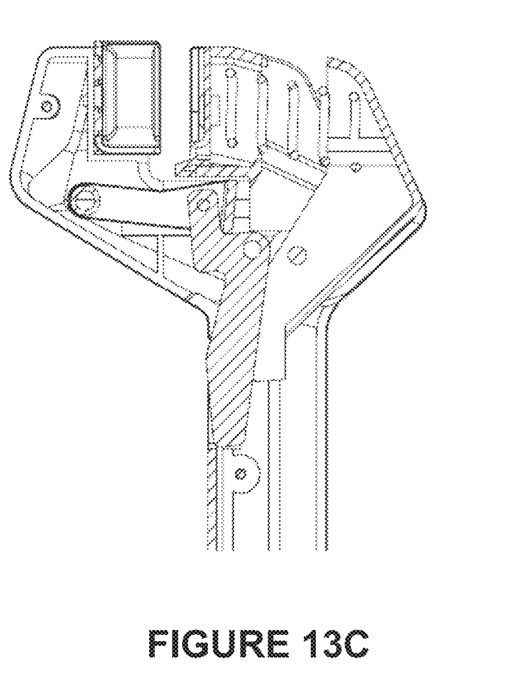
FIG. 13C is an enlarged view of the animal tag applicator 100 in the triggered position.

A trigger member 150 is provided to trigger the movement of the second jaw 120 towards the first fixed jaw member 110 when the second jaw 120 is held under bias by the biasing spring 170 and release the movable jaw 120 from the primed position. Specifically, the stop member 160 is coupled with the trigger member 150 such that movement of the trigger member 150 into a triggered position (by the user) effects biased movement of the second jaw 120 towards the first jaw 110 when the lever 140 is held by the user in the actuated position as shown in FIGS. 10 to 12. FIG. 13A illustrates an enlarged sectional side view of the applicator 100 in the initial non-actuated or open position. FIG. 13B illustrates an enlarged view of the movable jaw (also referred to as the second jaw) 120 whilst being held under the biasing force of the biasing spring 170 in the primed or actuated position. FIG. 13C illustrates an enlarged view of the movable jaw 120 (also referred to as the second jaw) 120 in the triggered position. The stopping member 160 comprises an elongate configuration and extends between two ends. A triangular stopping portion 162, located at an upper end portion of the stopping member 160, abuts a lower frontal portion 129 of the movable jaw 120 to limit movement of the movable jaw 120 in order to maintain a predetermined spacing (S) from the fixed jaw 110. The trigger member 150 includes a linking portion 152 of the trigger that is linked with a lower end portion 164 of the stopping member 160 when the moving jaw 120 is held under bias in the actuated position as shown in FIG. 13B. The lever 140 includes a recess 147 that is shaped for receiving the trigger member 150 and allowing the trigger member 150 to move within the recess 147 during the triggering of the trigger member 150 when a user applies a force on the frontal part of the trigger 150. In the primed position. Upon applying a triggering force on the frontal portion of the trigger member 150, the trigger member 150 turns about a pivot point within the recess 147 and the rear wall of the trigger 150 abuts the recess wall (see FIG. 13C). As a result, the upper portion of the trigger 150 including the linking portion 152 pushes the abutting end 162 of the stop member 160 in a downward direction. The downward movement of the abutting end of the stop member 160 causes the stopping portion 162 to no longer obstruct the movable jaw 120. Since the movable jaw 120 is biased by the spring 170, once the stopping portion 162 moves downwards (as a result of the trigger movement), the movable jaw 120 applies a thrusting force on the two-piece animal tag thereby mounting the animal tag on the animal's ear. The non-abutting end of the stop member 160 is linked to a lower portion of the fixed jaw (also referred to as the first jaw) 110 by a pin 165 to allow the stop member 160 to turn about the pin 165 during the triggering movement.

The provision of the trigger member 150 in combination with the lever member 140 in the presently described embodiment provides a significant advantage over the prior art tag applicators by reducing the extent of force that is required whilst mounting the animal tag on the animal's ear. The aforementioned arrangement of the movable lever 140 in combination with the trigger 150 provides an applicator 100 that can be operated by a two-step process. The first step involves pivoting the lever 140 to apply a resilient bias on the second jaw 120 and hold the second jaw 120 under a biasing force of the spring 170 to position the second jaw member 120 in the primed position such that the second jaw 120 is spaced sufficient away from the first fixed jaw 110 to allow the two piece animal tag to be inserted in between the spaced apart jaws 110 and 120. Once the applicator has been primed, the user may continue to hold the lever 140 in the actuated position whilst positioning the animal tag over animal's ear before pushing the trigger member 150 (a second movement) to trigger the movement of the second jaw 120 under the biasing force of the spring 170 which applies sufficient force to attach the two-piece tag to the animal's ear.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

The invention claimed is:

1. An animal tag applicator comprising: first and second jaws for engaging an animal tag therebetween wherein the second jaw is movable relative to the first jaw for mounting said animal tag on an animal; a movable lever coupled to the second jaw, the lever being pivotally movable relative to a handle and the lever comprising a proximal portion for receiving a user's hand to effect pivotal movement of the lever and a distal portion adjacent the second jaw, the lever being arranged such that at least a first movement of the lever into an actuated position results in a resilient bias being applied to the second jaw for movement of the second jaw towards the first jaw; a stop member positioned relative to the second jaw for maintaining the second jaw in an intermediate spaced apart position relative to the first jaw to prevent biased movement of the second jaw towards the first jaw when the lever is in the actuated position; a trigger member coupled with the stop member such that movement of the trigger member into a triggered position effects biased movement of the second jaw towards the first jaw when the lever is in the actuated position; and a biasing arrangement positioned between the distal portion of the lever and the second jaw for biasing the second jaw in said actuated position of the lever; wherein the lever is arranged so that pivotal movement of the proximal portion of the lever towards the handle effects movement of the distal portion of the lever towards the second jaw to thereby apply said resilient bias to the second jaw towards the first jaw, wherein the lever comprises a recessed portion for receiving at least a portion of the trigger such that in the triggered position, the trigger member abuts the recessed portion of the lever and wherein the stop member is substantially elongate and an end portion of the stop member abuts the second jaw to prevent biased movement of the second jaw towards the first jaw when the lever is in the actuated position.

2. The animal tag in accordance with claim 1, wherein the bias is applied to the second jaw for rectilinear movement of the second jaw towards the first jaw.

3. The animal tag applicator in accordance with claim 1, further comprising a pivoting arrangement for allowing said pivotal movement of the lever relative to the handle, the pivoting arrangement being positioned in between the proximal and distal portions of the lever.

4. The animal tag applicator in accordance with claim 1, wherein the distal portion of the lever comprises a retaining portion for receiving a biasing member thereon to apply resilient bias to the second jaw for rectilinear movement of the second jaw towards the first jaw.

5. The animal tag applicator in accordance with claim 4, wherein the second jaw further comprises a frontal portion with a tag engaging surface and a rear portion structured to be coupled with the biasing member.

6. The animal tag applicator in accordance with claim 1, further comprising a sliding arrangement for allowing the second jaw to slide along a supporting member positioned on an upper portion of the handle and for supporting the second jaw during use.

7. The animal tag applicator in accordance with claim 6, wherein the supporting member is configured to engage with a lower portion of the second jaw to allow the second jaw to slide along a length of the supporting member.

8. The animal tag applicator in accordance with claim 6, wherein a lower portion of the second jaw comprises engagement portions to engage and slide along one or more grooves extending along a length of the supporting member.

9. The animal tag applicator in accordance with claim 8, wherein the second jaw further comprises spaced apart web members, said web members comprising respective spaced apart engagement portions defining an opening for receiving a distal part of the lever.

10. The animal tag applicator in accordance with claim 9, wherein lower portions of the web members comprise engagement portions for engagement with corresponding grooves extending along the length of the supporting member.

11. The animal tag applicator in accordance with claim 1, wherein movement of the trigger member in an inward direction towards the lever in the triggered position effects downward movement of the stop member thereby allowing biased rectilinear movement of the second jaw towards the first jaw when the lever is in the actuated position.

12. The animal tag applicator in accordance with claim 11, wherein a lower portion of the stop member is structured to be seated on a seating portion of the trigger member such that the inward movement of the trigger member pushes the lower portion of the stop member in a downward direction thereby allowing biased rectilinear movement of the second jaw towards the first jaw when the lever is in the actuated position.

* * * * *